Dec. 12, 1939.   C. M. HERTER   2,182,921
ROTARY BEATER
Filed April 18, 1939   2 Sheets-Sheet 1
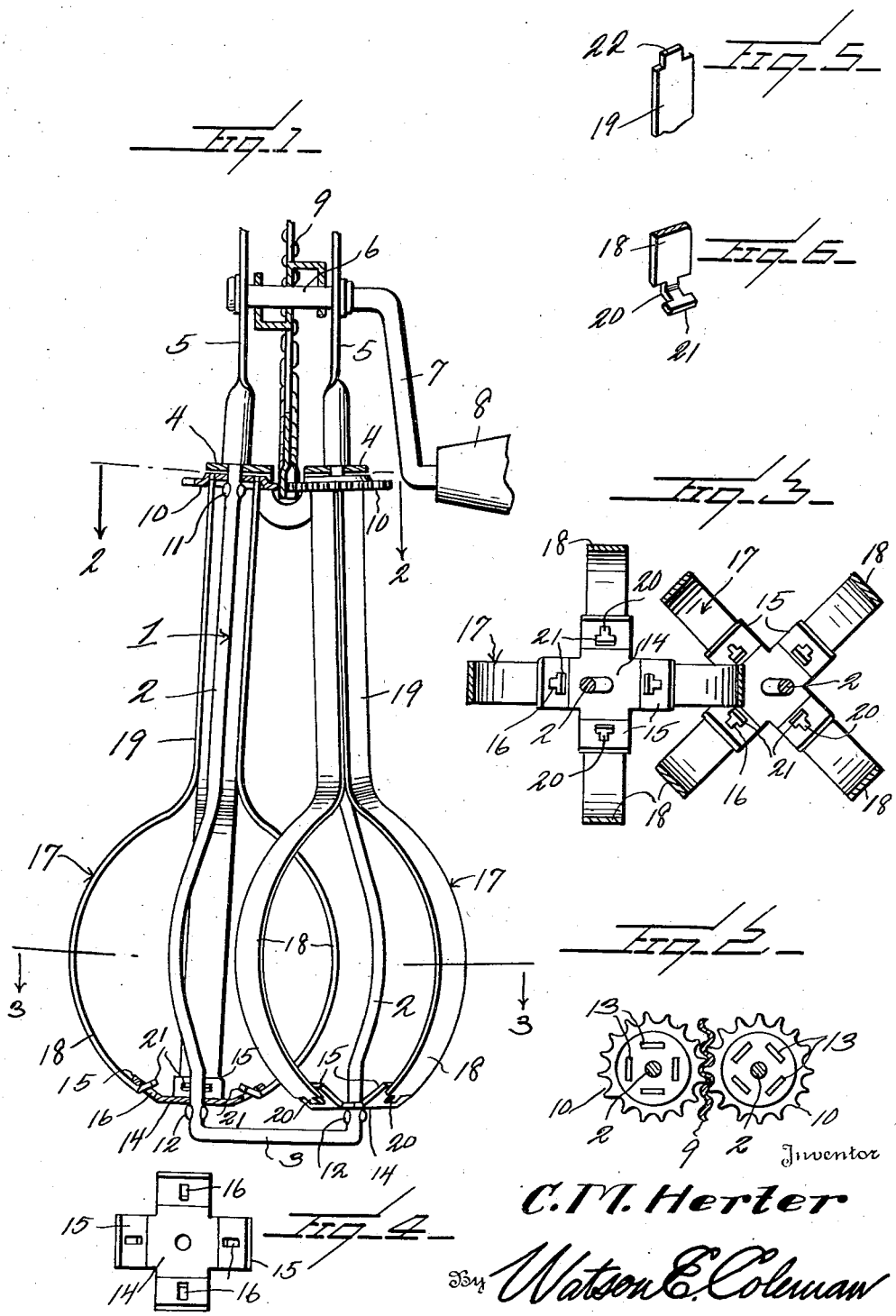
Inventor
C. M. Herter
By Watson E. Coleman
Attorney Dec. 12, 1939.     C. M. HERTER     2,182,921
ROTARY BEATER
Filed April 18, 1939     2 Sheets-Sheet 2
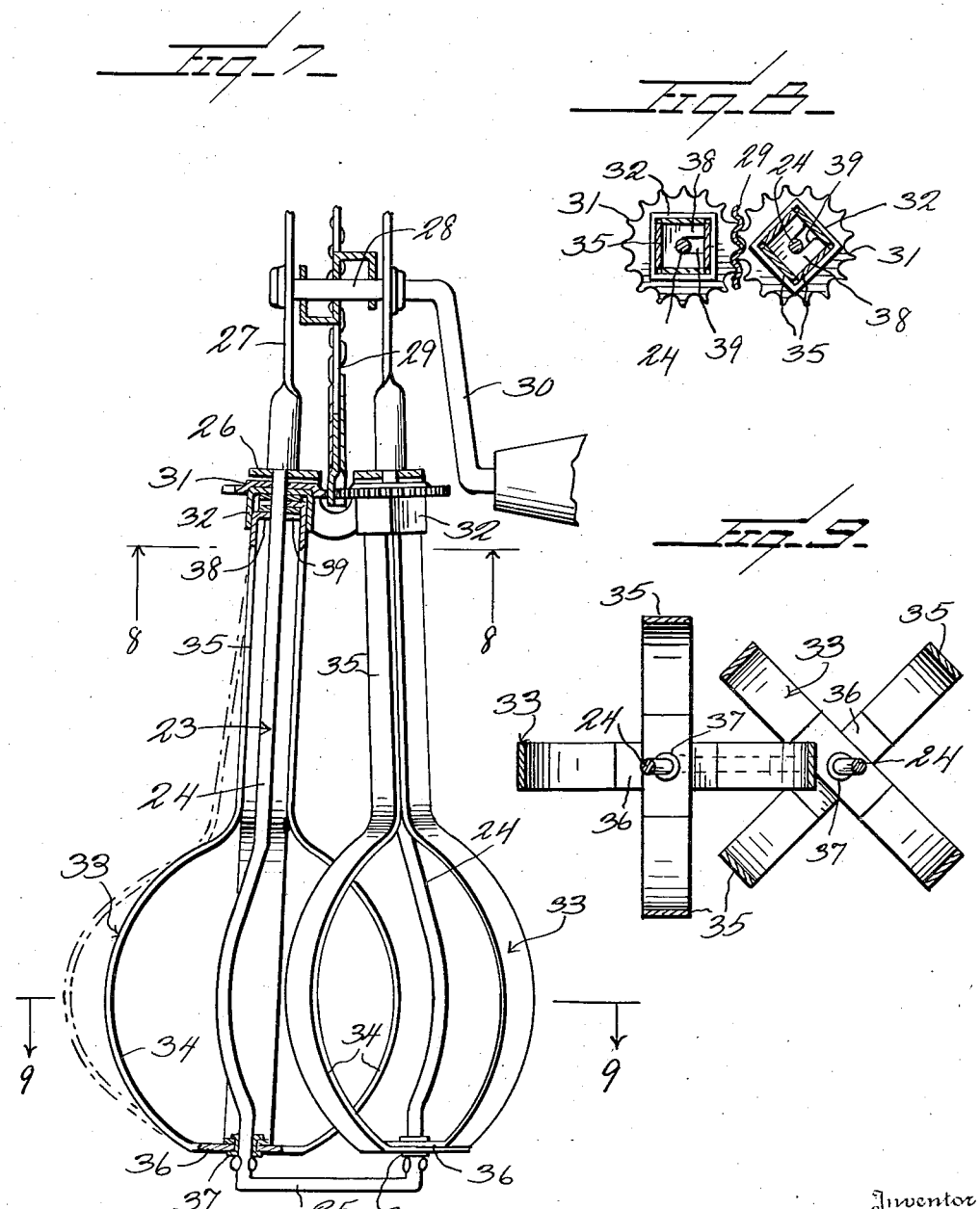
Inventor
C. M. Herter
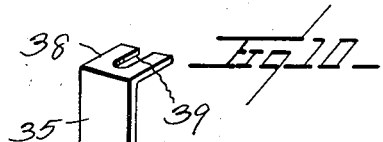
Attorney Patented Dec. 12, 1939

2,182,921

UNITED STATES PATENT OFFICE 2,182,921

ROTARY BEATER

Clarence M. Herter, West Branch, N. Y.

Application April 18, 1939, Serial No. 268,622

9 Claims. (Cl. 259—131)

This invention relates generally to the class of culinary or kitchen implements and pertains particularly to improvements in beaters or mixers of the rotary type.

In the ordinary type of rotary mixer or beater, the beater blades are normally secured in such a way that they are difficult to clean, particularly at the upper ends thereof where they usually come into relatively close relation, so that it is extremely difficult to get a cleaning implement between the blades to remove material adhering thereto. Because of the construction of the present type of rotary beater, the same cannot be kept in a proper sanitary condition without the exercise of extreme care and effort.

The present invention has for its primary object to provide a rotary beater in which the blades may be separated or completely detached so that they may be thoroughly cleaned after use, particularly at the upper ends which, as previously stated, normally come into convergent or closely associated relation.

Another object of the invention is to provide in a rotary beater a novel blade mounting whereby each blade may be completely detached from the beater structure for cleaning.

Still another object of the invention is to provide in a rotary beater a novel blade construction in which the blades are formed in connected pairs and the upper ends only are detachable from the assembly so that the blades, while being maintained on the beater frame, may be opened or spread apart for cleaning.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 illustrates a form of the present invention in which the beater blades are individually removable from the assembly for cleaning, the illustration showing a part of the beater structure in section and a part in elevation.

Fig. 2 is a section on the line 2—2 of Fig. 1.

Fig. 3 is a section on the line 3—3 of Fig. 1.

Fig. 4 is a view in plan of a coupling plate for one group of blades.

Fig. 5 is a view in perspective of the upper end of a blade.

Fig. 6 is a view in perspective of the outer or lower end portion of a blade.

Fig. 7 is a view illustrating another form of the invention wherein the blades are in connected pairs and the upper ends only are separable from the assembly, the structure as illustrated being partly in section and partly in elevation.

Fig. 8 is a section on the line 8—8 of Fig. 7.

Fig. 9 is a section on the line 9—9 of Fig. 7.

Fig. 10 is a perspective view of the upper portion of one blade of a pair.

Referring now more particularly to the drawings and more especially to the form of the invention as illustrated in Figs. 1 to 6, there is shown and indicated generally by the numeral 1, the usual elongated U-shaped frame which forms a part of that type of rotary beater which employs two sets of beater units. Such frame includes the elongated side portions or bars 2 which at their outer or lower ends are connected by the cross yoke 3 while at their upper ends they pass through and are connected by a gear plate 4. Above the plate 4 there are secured to the side bars 2 of the frame, the frame extension bars 5 which are in substantially parallel relation and these carry the usual centrally disposed and longitudinally extending handle (not shown). Extending transversely between the frame extension bars 5 is a shaft 6, one end of which is formed to provide the crank 7 which carries the crank handle 8 and secured to this shaft between the bars 5 is a relatively large driving gear 9 which passes between and meshes upon its two sides with the two gear pinions 10, each of which is rotatably supported upon the upper end of a frame bar 2 between the plate 4 and a means on the adjacent bar 2 for maintaining the gear against longitudinal movement, such means here being shown as in the form of ears 11 which are pressed from the bars 2. At their lower ends similarly pressed out ears 12 are formed from the bars 2 for the purpose hereinafter described.

In carrying out the present invention, each of the gear pinions 10 is provided with a series of relatively narrow slots 13, as shown in Fig. 2, these slots corresponding in number with the beater blades which are to be coupled together around the adjacent frame bar 2. There are here shown four slots in each gear pinion which are equi-distantly spaced and arranged to describe a square, each slot forming one side thereof.

At the outer or forward end of each frame bar 2 is a blade coupling plate 14 through the center of which the bar 2 passes, the plate being adapted to rotate about the bar and being held against longitudinal movement outwardly by the ears 12. Each plate 14 has the four outwardly extending arms 15, each of which is provided with the slot 16 which extends radially with respect to the bar 2 about which the plate turns. These arms 15 extend obliquely with respect to the upper side of the plate 14.

Disposed around each bar 2 is a group of four beater blades, each of which is generally designated by the numeral 17 and each of which comprises an outwardly bowed lower end portion 18 and the relatively long straight upper end portion 19. At the outer end of the bowed portion 18 of each blade there is formed a T-head 20, the top part 21 of which extends transversely of the blade, as shown in Fig. 6. The narrow or shank portion of each T-head is designed to fit snugly in a slot 16, the head being engaged in such slot by extending the portion 21 therethrough while holding it substantially parallel with the slot and then turning the blade after the cross portion 21 of the head has been inserted in the slot 16, so that the neck portion of the head will extend across the slot and the transverse or top portion of the head will be disposed across the inner side of the arm 15 while the adjacent end of the bow 18 will be disposed against the outer side of such arm, as is shown in Fig. 1. After a blade has had its outer end coupled with the slotted arm 15 of the connecting plate 14, the end of the upper portion 19 is coupled with a gear 10 by flexing or bowing the blade so as to shorten it sufficiently to facilitate the extension into a slot 13 of a gear pinion of the reduced end or tongue 22 which is formed at the free or upper end of the portion 19.

It will be seen from the foregoing that with the construction described, each of the beater blades 17 of each unit may be completely detached from the unit so as to facilitate thorough cleaning of the beater.

It will also be readily apparent that whereas the present description has been applied to a beater in which two sets of beater units or two groups of beater blades have been shown, the invention may be applied with equal facility to a beater employing only a single group of blades.

In Figs. 7 to 10, another form of the invention is illustrated. In the illustration of this form there is also shown a substantially U-shaped elongated frame 23 corresponding to the frame 1 and having the side bars 24 and the lower end connecting yoke 25, the upper ends of these bars being coupled together by the plate 26 and joining the spaced parallel extension bars 27 between which is rotatably mounted the crank shaft 28 which carries a driving gear 29 and which is formed to provide the operating crank 30.

In this form of the invention the gear pinions 31 which are mounted upon the upper ends of the bars 24 are each provided upon its lower face with a rectangular frame 32 which opens in the direction of the lower end of the frame 23. This frame 32 is relatively deep, as shown in Fig. 7.

Surrounding each of the frame bars 24 is a group of four beater blades, each of which is indicated by the numeral 33, and each of which comprises the outer or lower bow portion 34 and the relatively long straight inner portion 35. These blades in each group are joined together at their outer ends, that is, at the free ends of the bowed portions 34, by the straight connecting link 36 so that the blades are in pairs and these links are connected by a suitable sleeve 37 through which the outer end portion of the bar 24 passes.

At its upper end each straight portion 35 has a right angularly turned finger 38 which is provided with a slot 39 and these fingers are of a length to snugly fit in a frame 32 with the bar 24 engaging in the slot 39 thereof.

The straight portions 35 of each group of blades are of different lengths so that when the finger portion 38 of the longest blade is engaged in a frame 32, it will position against the inner side of the frame and when the finger portion of the next longest beater blade is put in position it will rest against the first inserted finger and so on, the fingers being built up from the inner side of the frame to the outer side thereof, as is shown at the left-hand side of Fig. 7.

The insertion of the fingers 38 of the blades of each group into their frame is effected by flexing or bowing each blade in the manner indicated in broken lines in Fig. 7, so that the blade may be shortened sufficiently to facilitate the extension of the fingered end into the frame.

With the construction shown in Fig. 7, it will be readily seen that whereas the inner or upper ends of the blades of each group of beaters may be separated for easy cleaning, the outer ends of the blades are permanently joined together so that the blades cannot be completely detached from the assembly as in the form of the invention shown in Fig. 1. In either case, however, the blades are separable so that the convergent ends, which are the parts hardest to keep clean in beaters of this character, may be separated to such an extent that the cleaning of the same may be easily accomplished.

It will also be apparent that the form of the invention shown in Fig. 7 may be readily applied to a rotary beater of the type having a single group of blades as well as to the type shown in which a double group is employed.

What is claimed is:

1. A beater, comprising an elongated frame bar, a group of beater blades disposed around said frame bar and adapted to rotate thereabout as a unit, a driven gear connected with said frame bar to rotate thereabout, means coupled with the frame bar for driving said gear, means joining said beater blades together at the outer end of the frame bar whereby the blades at said end of the bar may be separated one from another, and means detachably coupling the inner ends of the beater blades to said gear facilitating the separation of said inner ends one from the other.

2. A beater, comprising a frame bar, a group of beater blades disposed about said frame bar for rotation as a unit thereabout, a gear rotatably mounted on said frame bar at the inner end of the beater, means connected with the frame bar for turning said gear, a plate joined to the outer end of the frame bar for rotation thereabout, means detachably coupling the outer ends of the beater blades to said plate, and means detachably coupling the inner ends of the blades to said gear, the said coupling means between the ends of the blades and the plate and gear facilitating the selective removal of the blades from the group.

3. A beater, comprising a frame bar, a group of beater blades disposed about said frame bar for rotation as a unit thereabout, a gear rotatably mounted on said frame bar at the inner end of the beater, means connected with the frame bar for turning said gear, a plate joined to the outer end of the frame bar for rotation thereabout, means detachably coupling the outer ends of the beater blades to said plate, and means detachably coupling the inner ends of the blades to said gear, comprising a longitudinal terminal tongue engageable in a slot in the gear, the said means coupling the ends of the blades with the plate and gear facilitating the selective removal of the blades from the assembly.

4. A beater, comprising an elongated frame bar, a plurality of relatively long resilient beater blades extending longitudinally of and grouped around the bar and adapted to rotate as a group thereabout, means coupling the outer ends of the blades with the bar, a gear pivotally mounted upon the bar at its inner end, means coupled with the bar and with said gear whereby the gear may be rotated, and means coupling the inner ends of the blades with the gear which is so constructed and arranged that the said inner ends of the blades may be detached from the gear or attached thereto by the flexing and shortening of the blades.

5. A beater, comprising an elongated frame bar, a plate rotatably mounted on said frame bar at the outer end of the same, said plate including a series of arms extending obliquely from one side thereof and each having a slot therein, a gear rotatably mounted upon the inner end of the bar, means carried by the bar and connected with the gear for effecting the rotation of the latter, said gear having a series of slots therein, and a plurality of elongated flexible beater blades, each having an outwardly bowed outer end portion terminating in a T-head which is adapted for detachable engagement in the slot of an arm plate and a straight inner end portion terminating in a tongue adapted for detachable engagement in a slot of the gear.

6. A beater, comprising an elongated frame bar, a gear mounted upon the bar at the inner end thereof, means carried by the inner end of the bar and connected with said gear for effecting the rotation of the same, a plurality of elongated beater blades each having an outwardly bowed outer end portion and a straight inner end portion, said beater blades being connected at their outer end portions in pairs, the connected outer end portions of the pairs of blades being connected with said bar to rotate thereabout, a rectangular frame connected with said gear and surrounding the bar and having an open side directed toward the connected ends of the blades, and a slotted tongue extending laterally from the end of the inner part of each blade and adapted for insertion into said frame and to receive said bar, said blades being of varying lengths whereby said tongues may position one upon the other within the last mentioned frame.

7. A rotary beater, comprising an elongated frame bar, a gear mounted upon the bar at the inner end thereof to turn thereabout, means carried by the inner end of the bar and connected with said gear for effecting rotation of the same, a plurality of elongated beater blades each having an outwardly bowed outer end portion and a straight inner end portion, said blades being arranged in a group about and extending longitudinally of said bar, means pivotally coupling the outer ends of the blades with said bar, a frame connected with said gear and encircling the bar, the said blades being of a length to extend into said frame at their inner ends, and said blades being adapted to be detached at their inner ends from said frame by flexing the blades transversely whereby to effect sufficient shortening of the same to facilitate removal of the inner ends from the frame.

8. A rotary beater, comprising an elongated frame bar, a gear mounted upon the bar at the inner end thereof to turn thereabout, means carried by the inner end of the bar and connected with said gear for effecting rotation of the same, a plurality of elongated beater blades each having an outwardly bowed outer end portion and a straight inner end portion, said blades being arranged in a group about and extending longitudinally of said bar, means pivotally coupling the outer ends of the blades with said bar, a frame connected with said gear and encircling the bar, the said blades being of a length to extend into said frame at their inner ends, each of said blades at its inner end having a laterally extending terminal portion, each of said terminal portions being slotted to receive said bar when the terminal portion is disposed within the frame, the relative lengths of the blades being such that said terminal portions will be positioned one upon the other when disposed in the frame, and the said inner ends of the blades being disengageable from the bar and from within the frame by the transverse flexing of the blades to effect a shortening thereof.

9. A beater, comprising a frame, a plurality of beater blades supported in a group for rotation about frame, a gear supported on the frame for rotation thereabout, means for turning said gear, each of said blades having an end for connection to the gear, the gear being provided with means for receiving said end to detachably couple the blade and gear together, the coupling of the blade to the gear and the uncoupling thereof being effected by transversely flexing the blade to shorten its length.

CLARENCE M. HERTER.